Nov. 17, 1942. H. W. KOST 2,302,389
FASTENER
Filed July 23, 1940

Inventor
Harold W. Kost
By Malcolm W. Fraser
Attorney

Patented Nov. 17, 1942

2,302,389

UNITED STATES PATENT OFFICE 2,302,389

FASTENER

Harold W. Kost, Birmingham, Mich., assignor to Detroit Harvester Company, Detroit, Mich., a corporation of Michigan Application July 23, 1940, Serial No. 346,985

10 Claims. (Cl. 85—32)

This invention relates to sheet metal fastening devices but more particularly to a fastener in the form of a separate piece adapted threadedly to receive a screw-threaded member, the piece being formed to be initially applied to or mounted upon a support preparatory to receiving the screw-threaded member, such as a screw or bolt. This invention constitutes an improvement of the fastener shown in my U. S. Patent No. 2,273,648 of February 17, 1942, entitled Fastener to which reference is hereby made.

An object is to produce a fastener of the above character which can be readily mounted in a single assembly opening by threading the fastener into the opening in an inclined manner with respect to the plane of the opening and thereafter successively turning or rocking and shifting the fastener into the desired position, the fastener being formed with improved means for retaining it against undesired shifting movements during the application of a screw or bolt.

Another object is to produce a fastening device of the above character which has stop means disposed intermediate its length engageable with abutments at the side of the assembly opening for militating against undesired shifting movements.

A further object is to produce a fastener of the above type which can be introduced into a single assembly opening through which the threaded member, such as a screw or bolt, passes, one or both sides of the assembly opening having notched portions to receive a stop member deformed from the fastener, thereby to limit the shifting movement of the fastener.

A still further object is to produce a fastener of the above type which is effectively held against undesired shifting movements during the application of the screw or bolt and which is so designed as to effect a reasonably water-tight seal with the support to which the fastener is applied.

Other objects and advantages of the invention reside in details of construction and arrangement and for purposes of illustration but not of limitation, embodiments of the invention are shown in the accompanying drawing in which.

Figure 4:
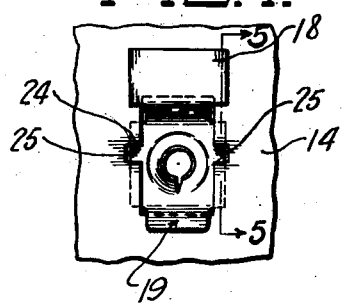
Figure 4 is a plan view of the outer side of the panel with the fastener mounted in position of use.

The illustrated embodiment of the invention shown in Figures 1 to 5 comprises a fastener of sheet metal having a body portion 12 which is considerably wider than the narrow dimension of the assembly opening 13. As shown, the assembly opening 13 provided in the supporting panel 14 is elongate and rectangular, it being observed that the body portion 12 overlaps opposite sides of the assembly opening 13 on the inner side of the panel 14 (Figure 4). In this instance, the body portion 12 is formed with a frusto-conical protuberance 15 having a screw-receiving opening 16 in the shape of an helix and a radial slit 17. A fastener of this type is well-known to those skilled in this art and further description thereof is not considered necessary. Reference is here made to the patent to Harold W. Kost, No. 2,169,182, dated August 8, 1939, wherein a fastener of this type is more fully described and illustrated. As shown in my co-pending application, a separate nut may be carried by the body portion 12 without departing from the spirit of the invention.

Figure 1:
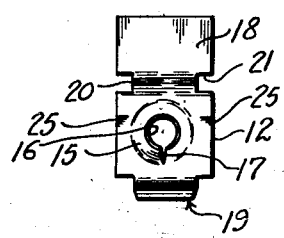
Figure 1 is a top plan view of a fastener embodying the invention.
Figure 2:
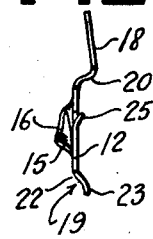
Figure 2 is a side edge view of the fastener shown in Figure 1.
Figure 3:
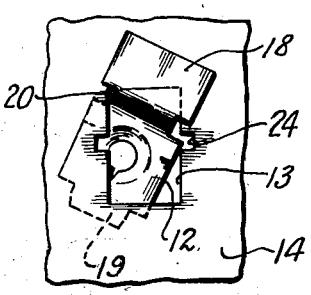
Figure 3 is a plan view showing the outer side of a portion of a supporting panel having an assembly opening and through which the fastener has been inserted in the preliminary stage and prior to its final positioning relative to the assembly opening.
Figure 5:
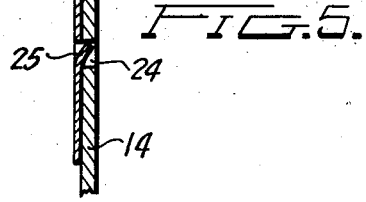
Figure 5 is a sectional view substantially on the line 5—5 of Figure 4.
Figure 6:
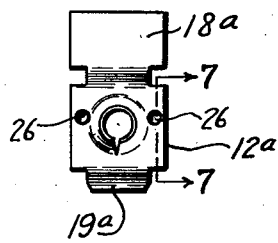
Figure 6 is a plan view of an alternate form in which the fastener is provided with stops in the form of nubbins instead of lips as shown in Figures 1 to 5.
Figure 7:
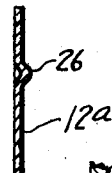
Figure 7 is an enlarged sectional view on the line 7—7 of Figure 6.
Figure 8:
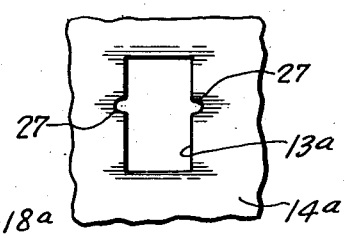
Figure 8 is a fragmentary view of the supporting panel showing the assembly opening and the notches which receive the nubbins for restricting or limiting shifting movement of the fastener when in applied position.
Figure 9:
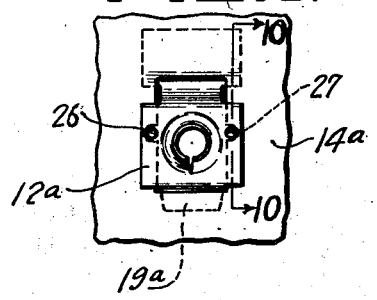
Figure 9 is a plan view of the fastener in its applied position viewing the inner side of the supporting panel.
Figure 10:
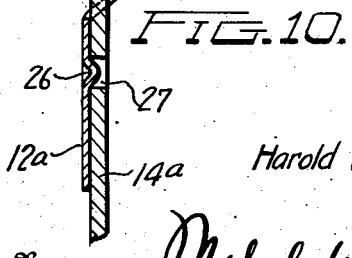
Figure 10 is an enlarged fragmentary sectional view on the line 10—10 of Figure 9.

Extending in opposite directions from the body 12 of the fastener are offset tongues 18 and 19, the amount of the offset being approximately the thickness of the metal of the supporting panel 14. The tongue 18 is substantially longer and wider than the tongue 19 and is adapted to overlap a portion of the outer side of the supporting panel 14. The tongue 18 is integrally secured to the body 12 by a neck portion 20 which is considerably narrower than the tongue 18 and the body 12, the neck being of substantially the same width as or slightly less than the width or narrow dimension of the assembly opening 13, slots or cutouts 21 being formed between the tongue 18 and the body 12 to form the neck 20. The tongue 18, as best shown in Figures 2 and 5, inclines from the end joined to the neck 20 inwardly in a direction toward the plane of the body portion 12, such inclination being relatively slight but sufficient so that the free edge portion of the tongue engages the adjacent side of the supporting panel as will hereinafter appear.

The relatively short tongue 19 is likewise integral with the body 12 and has a portion 22 integral with the body 12 which is substantially equal to or slightly narrower than the narrow dimension or width of the assembly slot 13. The portion 22 inclines inwardly from the body portion 12 and the extreme end portion 23 inclines slightly outwardly with respect to the portion 22. As shown, the portion 23 is slightly tapered to facilitate mounting of the fastener. Between the portions 22 and 23 of the tongue 19 is formed a shoulder which is adapted to abut against one end of the assembly slot 13 in the finally applied position of the fastener.

In this instance, a rectangular notch 24 extends inwardly from each of the longer sides of the assembly opening 13, the notches being disposed intermediate the ends of the assembly slot 13 and directly opposite to each other. Adapted to engage in the notches 24 are lips 25 which are lanced or cut from the metal of the body portion 12 at the opposite sides thereof. It will be understood that the distance between the ends or bottoms of each of the notches 24 should be approximately equal to the width of the body portion 12 to insure that the lips 25 will enter into the notches 24 in the finally applied position of the fastener.

In applying the fastener to the supporting panel 14, the tongue 18 is grasped and the body and associated structure is inserted through the longer dimension of the assembly opening 13 so that the screw-receiving protuberance 15 is disposed on the inner side of the panel 14. Thereafter, the fastener is rocked to position the body 12 on the inner side of the supporting panel and the reduced neck 20 enables such rocking or turning movement to be accomplished. The fastener is rocked until the tongue 18 is substantially in alignment with the assembly opening 13 and the smaller tongue 19 in registry with the opening. In this position the portion of the body 12 adjacent the tongue 18 is close to or in contact with the adjacent end of the opening 13. The next operation is to shift the fastener bodily toward the opposite end of the opening 13 and in such manner as to move the smaller tongue 19 into overlapping engagement with the outer side of the supporting panel 14 in the region of the opposite edge of the opening. To accomplish the positioning of the tongue 19 in overlapping relationship with the outer side of the panel, some flexing of the tongue 18 is necessary and there is sufficient spring or resiliency to the metal to retain the fastener snugly in place when the tongue 19 is moved to its final panel overlapping position. In accordance with such shifting movement the lips 25 are brought into registry with the notches 24 into which they enter with a snap action. The entry of the lips 25 into the notches 24 should substantially coincide with the engagement of the shoulder on the tongue 19 with the adjacent end of the slot 13.

It will be observed that the lips 25 are inclined in such direction as to facilitate movement of the fastener during such longitudinal shifting, but definitely militates against retrograde movement. A drift pin or other rod-like implement is inserted through the opening 16, thereby to flex the fastener so that the tongue 19 is in panel overlapping position and to impart the shifting movement to the fastener. An examination of Figure 5 shows that longitudinal shifting movement of the fastener in one direction is limited by the shoulder on the tongue 19 and shifting movement in the opposite direction is limited by the lips 25 which abut against the adjacent side edge of the notches 24. Thus it will be apparent that in applying a screw, bolt or other screw-threaded fastening member to the fastening device, the fastener will not become loosened either by longitudinal shifting relative to the supporting panel or by movement of the fastener away from the supporting panel.

The form shown on Figures 6 to 10 is similar to that above described but instead of lancing the metal to form lips 25 in the body portion 12, a pair of nubbins 26 are pressed out of the body portion 12a to project from the inside of the fastener. These are arranged adjacent the side edges of the body portion 12a and are adapted to enter rounded notches 27 which extend laterally of the assembly slot 13a. It should be understood that the distance between the opposite side edges of the body portion 12a should be equal to or slightly greater than the distance between the inner ends of the notches 27 so that in the finally applied position of the fastener, the notches will be covered thereby to provide a reasonably water-tight connection between the fastener and the supporting panel 14a. In this form it will be understood that the nubbins 26 militate against longitudinal shifting movement of the fastener in one direction and the shoulder formed on the smaller tongue 19a militates against shifting movement in the opposite direction. It will be understood that the remaining structure of the fastener is similar to that above described so that further explanation is not considered necessary.

It will be manifest that the above described fastener can be readily applied to a supporting panel formed with a single assembly slot or opening and through which the fastening member, such as a screw or bolt, extends. One important advantage of a fastener of this character is that the protruding portions are disposed in the main on the inner side of the supporting panel so that the outer side is comparatively free from sizable projections. A particularly important feature of this invention resides in the positive manner in which the fastener is held against shifting movements relative to the assembly slot, thereby militating against the fastener coming loose during the application of the screw or bolt. It will further be understood that this form of the fastener lends itself to relatively simple manufacture on a production basis, inasmuch as it may be formed in a progressive stamping operation.

It is to be understood that numerous changes in details of construction and arrangement may be effected without departing from the spirit of the invention as defined in the appended claims.

What I claim is:

1. The combination with a supporting structure having an elongate opening, of a fastener having a screw thread engaging means, the body portion of said fastener being wider than the narrow dimension of the opening, offset extensions on opposite ends of said body portion, a neck portion adapted substantially to fit the smaller dimension of the opening and connecting one extension to the body portion whereby the body portion is insertable in said opening from one side of the supporting structure and then turned to cause the body portion to overlap opposite sides thereof, the other extension being of a size to pass through the smaller dimension of the opening, the body portion being shiftable to cause said extensions to overlap opposite ends of the opening on the side of the supporting structure opposite to that engaged by the body portion, and means on said body portion and engageable at a side of said opening for militating against retrograde shifting movement.

2. The combination with a supporting structure having an elongate opening, said opening having a notched portion at one side thereof, of a fastener having a screw thread engaging means, the body portion of said fastener being wider than the narrow dimension of the opening, offset extensions on opposite ends of said body portion, a neck portion adapted substantially to fit the smaller dimension of the opening and connecting one extension to the body portion whereby the body portion is insertable in said opening from one side of the supporting structure and then turned to cause the body portion to overlap opposite sides thereof, the other extension being of a size to pass through the smaller dimension of the opening, the body portion being shiftable to cause said extensions to overlap opposite ends of the opening on the side of the supporting structure opposite to that engaged by the body portion, stop means on one extension for limiting such shifting movement, and means for militating against retrograde shifting movement, said last means comprising a part extending from the fastener into said notched portion.

3. The combination with a supporting structure having an elongate opening, said opening having diametrically opposed notched portions projecting from the sides thereof, of a fastener having a screw thread engaging means, the body portion of said fastener being wider than the narrow dimension of the opening, offset extensions on opposite ends of said body portion, a neck portion adapted substantially to fit the smaller dimension of the opening and connecting one extension to the body portion whereby the body portion is insertable in said opening from one side of the supporting structure and then turned to cause the body portion to overlap opposite sides thereof, the other extension being of a size to pass through the smaller dimension of the opening, the body portion being shiftable to cause said extensions to overlap opposite ends of the opening on the side of the supporting structure opposite to that engaged by the body portion, stop means on one extension for limiting such shifting movement, and means for militating against retrograde shifting movement, said last means comprising projections extending inwardly from said fastener into said notched portions respectively.

4. The combination with a supporting structure having an elongate opening, said opening having diametrically opposed notched portions projecting from the sides thereof, of a fastener having a screw thread engaging means, the body portion of said fastener being wider than the narrow dimension of the opening, offset extensions on opposite ends of said body portion, a neck portion adapted substantially to fit the smaller dimension of the opening and connecting one extension to the body portion whereby the body portion is insertable in said opening from one side of the supporting structure and then turned to cause the body portion to overlap opposite sides thereof, the other extensions being of a size to pass through the smaller dimension of the opening, the body portion being shiftable to cause said extensions to overlap opposite ends of the opening on the side of the supporting structure opposite to that engaged by the body portion, stop means on one extension for limiting such shifting movement, and means for militating against retrograde shifting movement, said last means comprising a pair of lips struck from the side edge portions and extending into said notched portions respectively.

5. The combination with a supporting structure having an elongate opening, said opening having diametrically opposed notched portions projecting from the sides thereof, of a fastener having a screw thread engaging means, the body portion of said fastener being wider than the narrow dimension of the opening, offset extensions on opposite ends of said body portion, a neck portion adapted substantially to fit the smaller dimension of the opening and connecting one extension to the body portion whereby the body portion is insertable in said opening from one side of the supporting structure and then turned to cause the body portion to overlap opposite sides thereof, the other extension being of a size to pass through the smaller dimension of the opening, the body portion being shiftable to cause said extensions to overlap opposite ends of the opening on the side of the supporting structure opposite to that engaged by the body portion, stop means on one extension for limiting such shifting movement, and means for militating against retrograde shifting movement, said last means comprising a pair of lips struck from the side edge portions and extending into said notched portions respectively, said lips being inclined to facilitate said shifting movement.

6. The combination with a supporting structure having an elongate opening, said opening having a notch at one side thereof, of a fastener having a screw thread engaging means, the body portion of said fastener being wider than the narrow dimension of the opening, offset extensions on opposite ends of said body portion, a neck portion adapted substantially to fit the smaller dimension of the opening and connecting one extension to the body portion whereby the body portion is insertable in said opening from one side of the supporting structure and then turned to cause the body portion to overlap opposite sides thereof, the other extension being of a size to pass through the smaller dimension of the opening, the body portion being shiftable to cause said extensions to overlap opposite ends of the opening on the side of the supporting structure opposite to that engaged by the body portion, stop means on one extension for limiting such shifting movement, and means for militating against retrograde shifting movement, said last means comprising a nubbin extending inwardly from said fastener to enter said notch upon predetermined shifting movement of the fastener.

7. The combination with a supporting structure having an elongate opening, said opening having a pair of laterally extending notches arranged in diametrically opposed relation, of a fastener having a screw thread engaging means, the body portion of said fastener being wider than the narrow dimension of the openings, offset extensions on opposite ends of said body portion, a neck portion adapted substantially to fit the smaller dimension of the opening and connecting one extension to the body portion whereby the body portion is insertable in said opening from one side of the supporting structure and then turned to cause the body portion to overlap opposite sides thereof, the other extension being of a size to pass through the smaller dimension of the opening, the body portion being shiftable to cause said extensions to overlap opposite ends of the opening on the side of the supporting structure opposite to that engaged by the body portion, stop means on one extension for limiting such shifting movement, and means for militating against retrograde shifting movement, said last means comprising a pair of nubbins projecting inwardly from said body portion adjacent the side edges thereof and extending into said notches respectively upon predetermined shifting movement of the fastener, said body overlapping said notches for sealing same.

8. The combination with a supporting structure having an opening, of a fastener, the body portion of said fastener being wider than one dimension of the opening, offset tongue extensions on opposite ends of said body portion, one extension being relatively long and inclining toward its free end in a direction toward the body portion and the other tongue extension being relatively short, the distance from one end of the body portion to the extreme end of the relatively short tongue being slightly less than the other dimension of said opening, a neck portion adapted substantially to fit said first dimension of the opening and connecting said relatively long tongue extension to the body portion whereby the body portion is insertable in said opening from one side of the supporting structure and then turned to cause the body portion to overlap the opposite side thereof, the other extension being of a size to pass through the opening, and the body portion being shiftable upon flexing the fastener to position the relatively small tongue in overlapping relation to the same side of the supporting structure overlapped by the relatively long tongue whereby the said tongues overlap one side of the supporting structure and the sides of the body portion overlap the opposite sides of the supporting structure.

9. The combination with a supporting structure having an opening, of a fastener, the body portion of said fastener being wider than one dimension of the opening, offset tongue extensions on opposite ends of said body portion, one extension being relatively long and inclining toward its free end in a direction toward the body portion and the other tongue extension being relatively short, the distance from one end of the body portion to the extreme end of the relatively short tongue being slightly less than the other dimension of said opening, a neck portion adapted substantially to fit said first dimension of the opening and connecting said relatively long tongue extension to the body portion whereby the body portion is insertable in said opening from one side of the supporting structure and then turned to cause the body portion to overlap the opposite side thereof, the other extension being of a size to pass through the opening, the body portion being shiftable upon flexing the fastener to position the relatively small tongue in overlapping relation to the same side of the supporting structure overlapped by the relatively long tongue whereby the said tongues overlap one side of the supporting structure and the sides of the body portion overlap the opposite sides of the supporting structure, and means on the fastener cooperating with the supporting structure for militating against retrograde shifting movement.

10. The combination with a supporting structure having an opening provided with lateral notch means, of a fastener, the body portion of said fastener being wider than one dimension of the opening, offset tongue extensions on opposite ends of said body portion, one extension being relatively long and inclining toward its free end in a direction toward the body portion and the other tongue extension being relatively short, the distance from one end of the body portion to the extreme end of the relatively short tongue being slightly less than the other dimension of said opening, a neck portion adapted substantially to fit said first dimension of the opening and connecting said relatively long tongue extension to the body portion whereby the body portion is insertable in said opening from one side of the supporting structure and then turned to cause the body portion to overlap the opposite side thereof, the other extension being of a size to pass through the opening, the body portion being shiftable upon flexing the fastener to position the relatively small tongue in overlapping relation to the same side of the supporting structure overlapped by the relatively long tongue whereby the said tongues overlap one side of the supporting structure and the sides of the body portion overlap the opposite sides of the supporting structure, and stop means on the fastener adapted to snap into said notch means upon such predetermined shifting movement for retaining the fastener against retrograde shifting movement.

HAROLD W. KOST.